United States Patent
Buechner

(10) Patent No.: US 9,207,707 B2
(45) Date of Patent: Dec. 8, 2015

(54) AUTOMATED SYSTEM AND METHOD FOR SYNCHRONIZING AN AUTOMATED SYSTEM

(71) Applicant: Baumueller Nuernberg GmbH, Nuremberg (DE)

(72) Inventor: Stephan Buechner, Eckental (DE)

(73) Assignee: BAUMUELLER NUERNBERG GMBH, Nuremberg (DE)

( * ) Notice: Subject to any disclaimer, the term of this patent is extended or adjusted under 35 U.S.C. 154(b) by 0 days.

(21) Appl. No.: 14/138,100

(22) Filed: Dec. 22, 2013

(65) Prior Publication Data
US 2014/0177769 A1    Jun. 26, 2014

(30) Foreign Application Priority Data
Dec. 21, 2012   (EP) .................................... 12008586

(51) Int. Cl.
*H04L 7/00* (2006.01)
*G06F 1/12* (2006.01)
*H04J 3/06* (2006.01)

(52) U.S. Cl.
CPC ................. *G06F 1/12* (2013.01); *H04J 3/0658* (2013.01)

(58) Field of Classification Search
CPC ....... H04L 7/0008; H04L 7/02; H04L 7/0331; G06F 1/12; H04J 3/0658
See application file for complete search history.

(56) References Cited

U.S. PATENT DOCUMENTS

| | | | |
|---|---|---|---|
| 8,126,019 B2 | 2/2012 | Schultze | |
| 2010/0077246 A1* | 3/2010 | Dittrich | G06F 1/12 713/375 |
| 2011/0256840 A1* | 10/2011 | Kobayashi et al. | 455/130 |
| 2012/0032855 A1* | 2/2012 | Reede | G01S 5/0289 342/458 |

FOREIGN PATENT DOCUMENTS

| | | |
|---|---|---|
| DE | 10 2008 049 161 A1 | 4/2010 |
| EP | 1 657 619 A2 | 5/2006 |

OTHER PUBLICATIONS

Cena et al., "Evaluation of EtherCAT Distributed Clock Performance," IEEE Trans. on Industrial Informatics, vol. 8, No. 1, pp. 20-29 (Feb. 2012).

\* cited by examiner

*Primary Examiner* — Ted Wang
(74) *Attorney, Agent, or Firm* — Muncy, Geissler, Olds & Lowe, P.C.

(57) ABSTRACT

An automated system and method that includes at least two cooperating electrical components, each having a time counter. The electrical components being coupled to one another via signals for cyclically transmitting process data via a signal network, and are synchronized with one another based on global, relative time information as a reference quantity.

17 Claims, 1 Drawing Sheet

AUTOMATED SYSTEM AND METHOD FOR SYNCHRONIZING AN AUTOMATED SYSTEM

This nonprovisional application claims priority under 35 U.S.C. §119(a) to European Patent Application No. EP 12 008 586.5, which was filed in Europe on Dec. 21, 2012, and which is herein incorporated by reference.

BACKGROUND OF THE INVENTION

1. Field of the Invention

The invention relates to an automated system and a method for synchronizing an automated system. An automated system can be understood to mean a production line, but also any other automation approach in the field of mechanical engineering.

2. Description of the Background Art

In automated systems which include at least two electrical components, for example production lines or also CNC machines, synchronization of the individual components is necessary. Thus, grippers and machining units such as drills must be coordinated with one another so that the machining does not begin until the gripper has brought a component to be machined into the desired position. To ensure the highest possible machining speed, position measurement using sensors is not desirable. Instead, machining is carried out based on time information which is sent to the components via a signal network.

A method for time synchronization in a cyclically operating communication system is known from EP 1 657 619 B1, which corresponds to U.S. Pat. No. 8,126,019. In this method, absolute time information is sent one time to all participants in the communication system, and is used as a reference quantity for computing in each case a local time for each of the communication participants. The absolute time information is present in the format "2000-04-01, 16:05:30, 123," for example.

SUMMARY OF THE INVENTION

It is therefore an object of the invention to provide a particularly suitable automated system, and a particularly suitable method for synchronizing an automated system which is carried out independently and in a comparatively simple manner.

In an embodiment, the automated system includes two electrical components which cooperate with one another. The automated system is a production line, a printing machine, or a CNC milling machine, for example. In addition, automated systems include any automation approaches in the field of mechanical engineering. In other words, an automated system is understood to mean any systematic assembly of machines or devices in a spatial relationship with one another, the machines or devices being referred to as electrical components. In this regard, the automated system may also form only a section of a more comprehensive, larger system.

The two electrical components can cooperate; i.e., in particular one of the two components can be dependent on the other respective component. The electrical components can be particular sensors and/or actuators, for example an electric motor which in particular drives a conveyor belt or the like, or other machines such as grippers. Each of the components can have its own time counter, and the components are connected to one another via a signal network. This is achieved, for example, by means of suitable data transmission cables, or wirelessly. Process data are cyclically transmitted via the signal network. In other words, there is a periodic exchange of data between the individual components by means of a cyclical transmission via the signal network. The signal network is preferably a field bus or some other bus system, suitably an EtherCAT system.

In particular for adhering to a time segment which is assigned to each electrical component and in which the particular process data are transmitted via the signal network, the electrical components can be synchronized with one another. To this end, a shared reference quantity is used for the time counters of all components. Based on this reference quantity, a local time stamp is determined for each electrical component by means of the time counters. For this purpose, in each case the elapsed time since the reference quantity is determined and used as a local time stamp. The reference quantity itself is global time information, i.e., time information which is valid for the complete automated system, or at least the portion of the automated system which is synchronized.

In addition, the time information is relative, and accordingly has only one reference to the automated system. In particular, the relative time information is essentially independent of events which occur or have occurred outside the automated system, or which have no reference to the automated system. The global, relative time information is, for example, the point in time of completion of a process, for example the completion of the hundredth manufactured piece, the point in time of a replacement or repair of a certain part of the system, or the like.

Due to the use of global, relative time information, on the one hand complicated coordination of the automated system with other systems which must also be checked and verified is not necessary. In addition, this type of coordination is not immune to errors. On the other hand, the global, relative time information is available to all components of the automated system, so that all electrical components may be coordinated with one another. It is thus possible to increase the machining speed of the automated system.

In an embodiment of the invention, the global, relative time information is a change of state. In other words, the point in time of a certain change in the state of the automated system is used as the reference quantity. In particular, the global, relative time information is not a time per se. For example, the change of state is the beginning of energization of the automated system, or the point in time of the first start-up of the automated system. The change of state of the automated system pertains to each of the electrical components, so that they obtain a uniform reference quantity. In this regard, it is also not necessary to send additional Information, for example a time telegram, via the signal network, which results in impairment of the bandwidth of the signal network. In addition, any differences in propagation time do not have to be taken into account.

The change of state can be a change of the automated system into an operating state. In other words, the components are synchronized based on the change into the operating state. Consequently, the time interval between the interaction of the electrical components and their synchronization based on the shared reference quantity is comparatively small, so that the synchronization is provided, at least for a certain time after the automated system starts operation, even in the event of possible deviations or inaccuracies of the time counters with respect to one another.

The change can be made into the operating mode from a standby mode in which components of the automated system are already energized. In particular, an electrical voltage is already applied to the electrical components in standby mode. Thus, for example, any capacitors or the like which are present do not have to be charged, which on the one hand results in essentially immediate operational readiness of the automated system. On the other hand, in this case essentially immediate registration of the relative, global time information is made possible. As a result, there is essentially no deviation in the receipt and/or the processing of the relative, global time information for the individual electrical components, and instead the receipt and/or the processing is/are simultaneous. If an EtherCAT standard is used as the signal network, in particular the change from "preoperational" to "operational," or, when field buses are used, at least a change to "operational," is utilized as the change.

In particular the change of state itself can be transmitted via the signal network. In other words, a message is transmitted via the signal network and is received by the individual electrical components. When the message is received, at least a portion of the electrical components of the automated system change the operating mode, so that the automated system is transferred into a new state. In addition, all electrical components use the point in time of receipt of the message, which triggers a change in the state of the automated system, as a reference quantity for the synchronization. Due to the transmission of the change of state via the signal network, no further registration of the state of the automated system by the electrical components themselves is necessary. In addition, due to using the message which transmits and initiates the change of state, a time shift between the actual change of state and the point in time which is used as the reference quantity is not present, as is the case for the use of two or more messages and the resulting latency.

The respective time counters of the electrical components can be activated after they receive the global, relative time information. At a minimum, however, the time counting begins in each electrical component by means of the time counters after the registration of the global, relative time information. In particular, in addition time counting takes place by means of the time counters prior to receipt of the global, relative time information. In other words, the time counters are activated essentially continuously, even for a possible change into standby mode. It is thus possible; even for points in time prior to receipt of the global, relative time information, to compute the local time stamp based on the global, relative time information after it is received, and thus, for example, to carry out evaluation by coordinating the components prior to the synchronization. In addition, the complexity of coordination is reduced.

The respective time counters can be set to zero (0) when the global, relative time information is received and/or registered by the electrical components. For example, the time counters are in the zero (0) state prior to the point in time of the reference quantity. However, it is particularly preferred for the time counters to be set to zero (0) as soon as the global, relative time information is received by the individual electrical components.

For example, the electrical components have different cycle times, which in particular are independent of one another. The cycle times are advantageously at least known in order to compute the local time stamp in each case. All time counters suitably have the same cycle time. In particular, the cycle counters are structurally identical, which simplifies replacement and maintenance. If the time counters are set to zero (0) upon receipt of the global, relative time information, as a result all time counters have the same value after any given time period, which on the one hand simplifies coordination of the electrical components with one another, and on the other hand simplifies any error search. In particular, the shortest time period of all electrical components which must be achieved for proper operation of the automated system is used as the cycle time of all time counters. In other words, the cycle time is the quickest, shortest time period of all electrical components which must be achieved for proper operation of the automated system.

The cycle time of the signal network can be an integral multiple of the cycle time of the time counters, each electrical component exchanging process data via the signal network exactly once during a cycle of the signal network. In particular, the start of one of the cycles of the signal network coincides with the start of one of the cycles of one of the electrical components, preferably of all electrical components. Comparatively complicated assignment of the cycles of the individual components with one another and also in relation to the signal network is thus avoided, resulting in a reduction in computational effort.

The electrical components can each have a buffer memory in which the particular process data are stored, at least until they are sent via the signal network. It is thus possible to store the process data in the full resolution of the particular electrical component, and at the same time to represent the process data in a lower time resolution. In this way, the bandwidth of the signal network is not overloaded. In particular, the time resolution of the process data sent via the signal network is communicated to the particular electrical component by the recipient of the process data. It is thus possible to detect the process data collection by the particular electrical component together with its respective maximum time resolution, thus avoiding complicated reprogramming of the process data collection. The time resolution necessary for the recipient is sent via the signal network, which requires only a fraction of the bandwidth necessary for the full time resolution; however, the transmitted time resolution is still adequate for proper operation of the automated system.

In particular, the process data in the particular buffer memory are recorded essentially continuously during a predefined time period, advantageously during the operating state, and the process data are transmitted via the signal network. Even after the process data recording is stopped or terminated by means of the particular buffer memory, the comparatively high-resolution process data with respect to time are still available, and thus readable via the signal network. The buffer memories are suitably designed as ring memories.

After a change into standby mode, the process data stored in the buffer memory are preferably transmitted via the signal network, so that comparatively high-resolution process data with respect to time are also available. The bandwidth requirements of the signal network are comparatively low during standby mode, so that no impairment of the automated system occurs.

The method for synchronizing an automated system provides that global, relative time information is used as a reference quantity for time counting in at least two components of the automated system which have a time counter. This information is preferably transmitted via a signal network which connects the components to one another and which is provided for cyclically sending process data.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
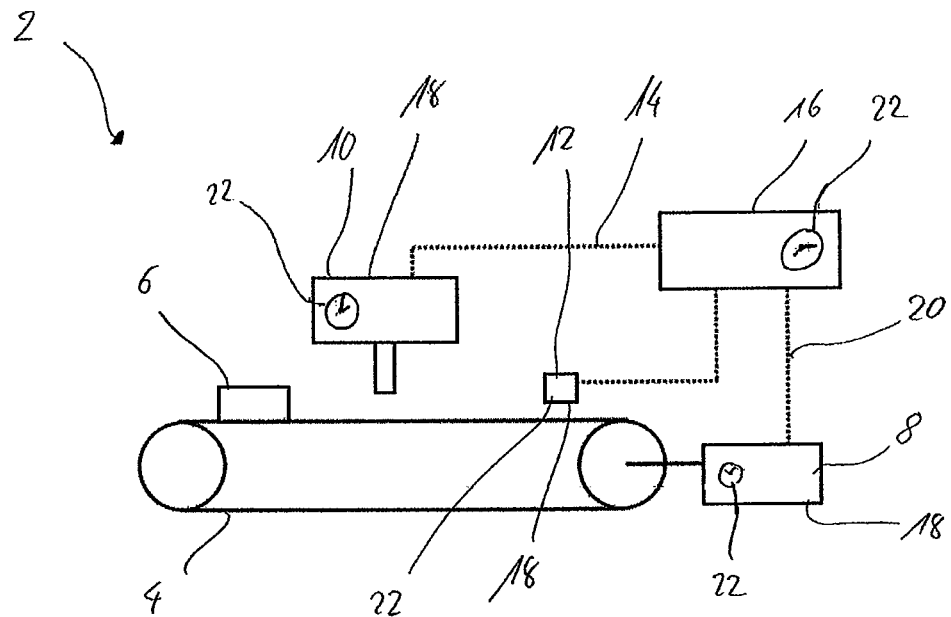
FIG. 1 schematically shows an automated system having electrical components.

FIG. 1 schematically illustrates in a simplified manner an automated system 2 having a conveyor belt 4 on which a manufactured product 6 is present. The conveyor belt 4 is operated by means of an electric motor 8, and thus changes the position of the manufactured product 6. In addition, the automated system 2 has a gripping and machining head 10 as well as a photoelectric barrier 12 which, the same as the electric motor 8, are connected to a process control system 16 via a signal network 14. An EtherCAT field bus system is used as the signal network 14. The gripping and machining head 10 and the electric motor 8 each represent an actuator, and the photoelectric barrier 12 represents a sensor, of the automated system 2. These electrical components 8, 10, 12 each include a buffer memory 18 in which process data 20 which are periodically transmitted via the signal network 14 are stored. For this purpose, each electrical component 8, 10, 12 has a time counter 22 by means of which a time window for transmitting the respective process data is assigned to each of the electrical components 8, 10, 12.

Figure 2:
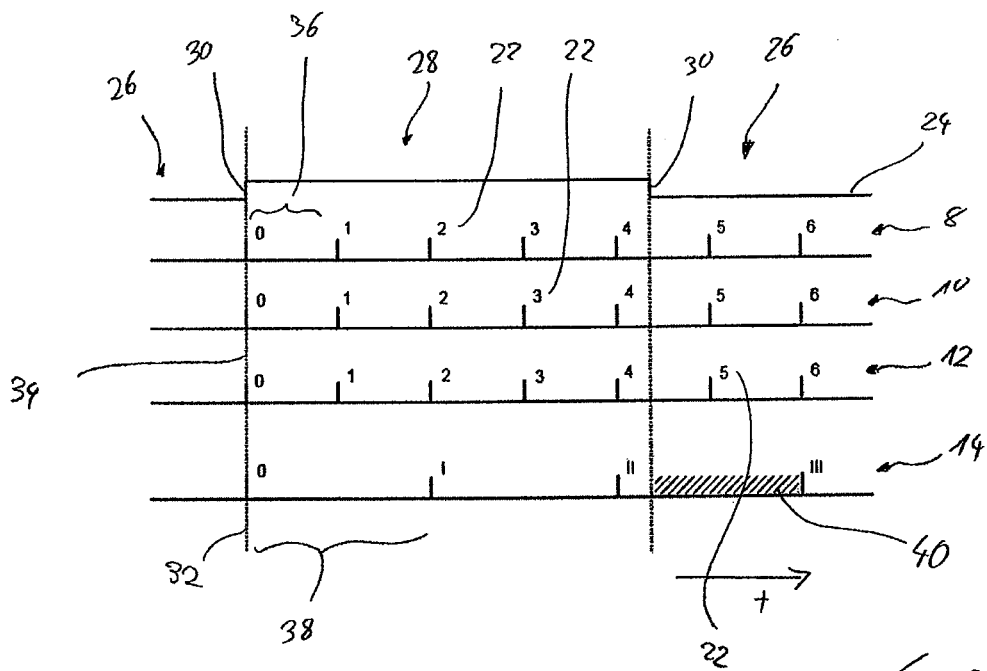
FIG. 2 shows synchronized communication of the components.

For this purpose, synchronization of the electrical components 8, 10, 12 and of the process control system 16 is necessary, as illustrated in FIG. 2. The time characteristic of the state 24 of the complete automated system 2 is shown in the top line. The automated system is transferred from a standby mode 26, during which the process control system 26 is energized but the electrical components 8, 10, 12 do not perform any action or record data, into an operating state 28 as the result of a change of state 30.

During the operating state 28, the electric motor 8 is energized and therefore the conveyor belt 4 is set in motion, which causes a change in position of the manufactured product 6. In addition, as soon as it is in a suitable position the manufactured product 6 is machined by means of the gripping and machining head 10. After machining is complete, the state 24 of the automated system 2 is once again transferred into standby mode 26 as the result of a further change of state 30. The change of state 24 is initiated by means of a suitable SET command which is transmitted via the signal network 14.

When the first SET signal, which initiates the change of the automated system 2 from standby mode 26 into the operating state 28, passes through the signal network 14, this point in time is used as global, relative time information 32 for synchronizing the electrical components 8, 10, 12. As shown beneath the state 24 of the automated system 2, upon receipt of the SET signal the time counters 22 of the electrical components 8, 10, 12 are set to zero (0) and the change of state 30 is accordingly used as a reference quantity 34, after which the elapsed time is counted by the time counters 22.

All time counters 22 of the electrical components 8, 10, 12 have a known, identical cycle time 36. In other words, the counter reading of the time counters 22 after a given time is essentially the same. The counter reading of the time counters indicates how many cycles have occurred since the reference quantity 34, and the local time stamp is the counter reading multiplied by the cycle time 36.

The cycle time 36 of the electrical components is equal to one-half of a cycle time 38 of the signal network 14, while the signal network sends the process data, recorded in the respective buffer memory 18, from each of the electrical components 8, 10, 12 to the process control system 16 via the signal network 14. In this regard, the order of sending is always the same. To conserve bandwidth, not all process data which have been recorded during a cycle time 38 of the signal network 14 by the particular electrical component 8, 10, 12 are sent via the signal network 14. Rather, only data which are necessary for proper functioning are provided to the process control system 16.

Transmission of the comparatively high-resolution process data with respect to time which are stored in the respective buffer memory 18, designed as ring memory, of the electrical components 8, 10, 12 takes place via the signal network 14, depending on the instantaneous requirements or as needed, for example when the manufactured product 6 is at a certain location on the conveyor belt 4, or for checking the functionality of the individual electrical components 8, 10, 12. In this regard, the point in time of the transmission is comparatively arbitrary, and the transmission may take place during the operating state 28 as well as during standby mode 26.

After the change back to standby mode 26, for the cycle time 28 which has already begun, communication between the process control system 16 and the electrical components 8, 10, 12 is maintained 14 in a time window 40 via the signal network. The electrical components 8, 10, 12 record no further data during the time window 40. Rather, the process data already stored in the respective buffer memory 18, i.e., process data which are provided with the cycle time 36 of the time counters 22, are sent to the process control system 16 in full time resolution in order to determine any signs of wear or other impairments of the electrical components 8, 10, 12.

The invention is not limited to the exemplary embodiment described above. Rather, other variants of the invention may also be deduced by those skilled in the art without departing from the subject matter of the invention. In particular, all individual features described by the exemplary embodiment may also be combined with one another in another way without departing from the subject matter of the invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An automated system comprising at least two cooperating electrical components, each of the at least two cooperating electrical components having a time counter, which are coupled to one another via signals for cyclically transmitting process data via a signal network, and which are synchronized with one another based on global, relative time information as a reference quantity, wherein the global, relative time information includes a time resolution value.

2. The automated system according to claim 1, wherein the global, relative time information is a change of state.

3. The automated system according to claim 2, wherein the change of state is a change into an operating state or from a standby mode.

4. The automated system according to claim 2, wherein the change of state is transmitted via the signal network.

5. The automated system according to claim 1, wherein the time counter is activated after receipt of the global, relative time information.

6. The automated system according to claim 1, wherein the time counters are set to zero upon receipt of the global, relative time information.

7. The automated system according to claim 1, wherein all time counters have a same cycle time, and wherein a cycle time of the signal network is an integral multiple of the cycle time of the time counters.

8. The automated system according to claim 1, wherein the components each have a buffer memory for storing the process data.

9. The automated system according to claim 8, wherein the transmission of the process data stored in a buffer memory takes place via the signal network after a change into a standby mode or as needed.

10. The automated system according to claim 1, wherein all time counters have a same cycle time.

11. The automated system according to claim 10, wherein the cycle time is determined by a shortest processing period of all the cooperating electrical components.

12. The automated system according to claim 10, wherein a cycle time of the signal network is an integral multiple of the cycle time of the time counters, and wherein the cycle time of the signal network is set by the time resolution value.

13. The automated system according to claim 1, wherein the time resolution value determines a cycle time of the of the signal network.

14. A method for synchronizing an automated system, the method comprising:
    providing at least two cooperating electrical components, each having a time counter, which are coupled to one another via signals for cyclically transmitting process data via a signal network; and
    using global, relative time information as a reference quantity, wherein the global, relative time information includes a time resolution value.

15. An automated system comprising at least two cooperating electrical components, each of the at least two cooperating electrical components having a time counter, which are coupled to one another via signals for cyclically transmitting process data via a signal network, and which are synchronized with one another based on global, relative time information as a reference quantity, wherein the time counter is activated after receipt of the global, relative time information.

16. An automated system comprising at least two cooperating electrical components, each of the at least two cooperating electrical components having a time counter, which are coupled to one another via signals for cyclically transmitting process data via a signal network, and which are synchronized with one another based on global, relative time information as a reference quantity, wherein the global, relative time information is a change of state and wherein the change of state is transmitted via the signal network.

17. An automated system comprising at least two cooperating electrical components, each of the at least two cooperating electrical components having a time counter, which are coupled to one another via signals for cyclically transmitting process data via a signal network, and which are synchronized with one another based on global, relative time information as a reference quantity, wherein all time counters have a same cycle time, and wherein a cycle time of the signal network is an integral multiple of the cycle time of the time counters.

* * * * *